(12) United States Patent
Tsubaki et al.

(10) Patent No.: US 10,079,112 B2
(45) Date of Patent: Sep. 18, 2018

(54) METHOD FOR PRODUCING ELECTROLYTIC CAPACITOR

(71) Applicant: Panasonic Intellectual Property Management Co., Ltd., Osaka (JP)

(72) Inventors: Yuichiro Tsubaki, Kyoto (JP); Masahiro Kajimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 33 days.

(21) Appl. No.: 15/619,570

(22) Filed: Jun. 12, 2017

(65) Prior Publication Data

US 2017/0278639 A1 Sep. 28, 2017

Related U.S. Application Data

(63) Continuation of application No. PCT/JP2015/006194, filed on Dec. 11, 2015.

(30) Foreign Application Priority Data

Dec. 26, 2014 (JP) ................................. 2014-264488

(51) Int. Cl.
| | | |
|---|---|---|
| *H01G 9/00* | (2006.01) | |
| *H01G 9/028* | (2006.01) | |
| *H01G 9/048* | (2006.01) | |
| *H01G 9/15* | (2006.01) | |
| *H01G 9/035* | (2006.01) | |
| *H01G 9/08* | (2006.01) | |

(52) U.S. Cl.
CPC ........... *H01G 9/0036* (2013.01); *H01G 9/028* (2013.01); *H01G 9/048* (2013.01); *H01G 9/15* (2013.01); *H01G 9/035* (2013.01); *H01G 9/08* (2013.01)

(58) Field of Classification Search
None
See application file for complete search history.

(56) References Cited

U.S. PATENT DOCUMENTS

| | | | |
|---|---|---|---|
| 6,307,735 B1 * | 10/2001 | Saito | H01G 9/025 361/512 |
| 6,962,612 B1 | 11/2005 | Saito et al. | |
| RE45,994 E | 5/2016 | Saito et al. | |
| 2003/0147202 A1 | 8/2003 | Kudoh et al. | |
| 2004/0184221 A1 | 9/2004 | Kudoh et al. | |
| 2011/0188173 A1 * | 8/2011 | Ota | H01G 9/26 361/525 |
| 2014/0022705 A1 | 1/2014 | Tomioka et al. | |

FOREIGN PATENT DOCUMENTS

| | | |
|---|---|---|
| JP | 11-283874 | 10/1999 |
| JP | 2001-155964 | 6/2001 |
| JP | 2014-067949 | 4/2014 |
| WO | 2012/137969 | 10/2012 |

OTHER PUBLICATIONS

International Search Report of PCT application No. PCT/JP2015/006194 dated Feb. 23, 2016.

* cited by examiner

*Primary Examiner* — Calvin Choi
(74) *Attorney, Agent, or Firm* — McDermott Will & Emery LLP

(57) ABSTRACT

A method for producing an electrolytic capacitor is performed in the following procedure. A solid electrolyte layer including a conductive polymer and a polyhydric alcohol is formed on an anode body on which a dielectric layer is formed. Then, the anode body on which the solid electrolyte layer is formed is impregnated with a first treatment liquid that contains an oxoacid having two or more hydroxy groups.

14 Claims, 4 Drawing Sheets

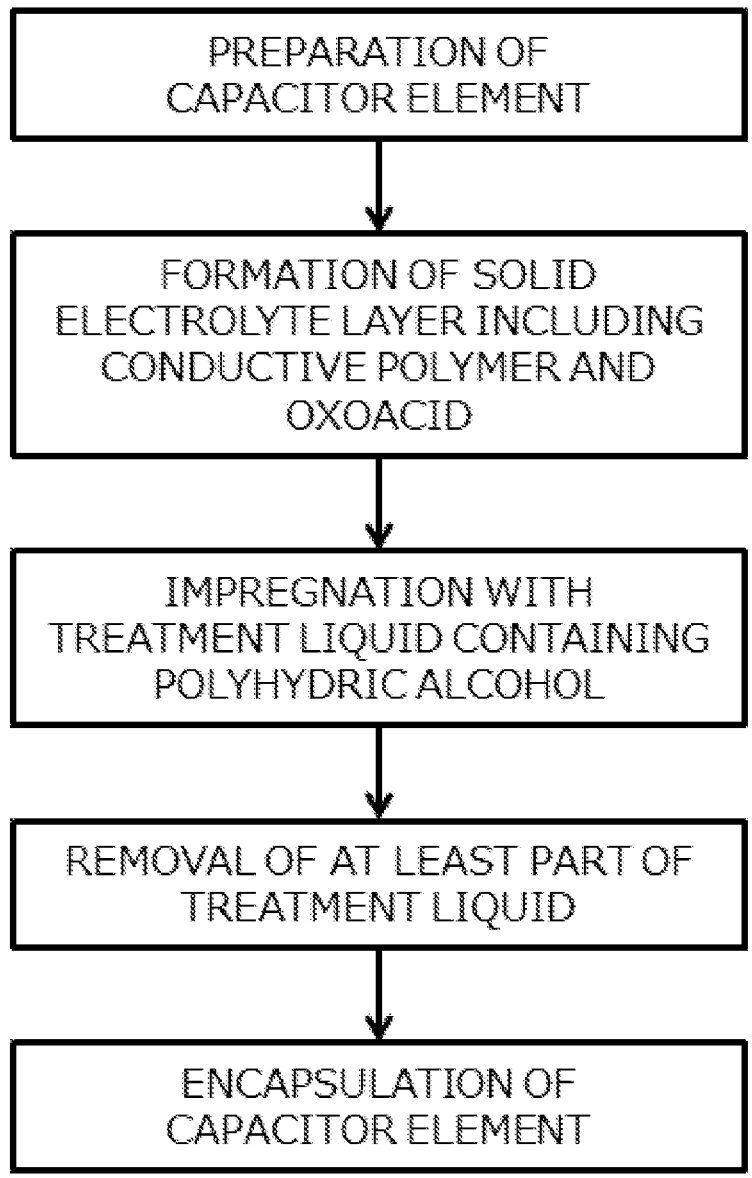

METHOD FOR PRODUCING ELECTROLYTIC CAPACITOR

RELATED APPLICATIONS

This application is a Continuation of International Application No. PCT/JP2015/006194, filed on Dec. 11, 2015, which in turn claims priority from Japanese Patent Application No. 2014-264488, filed on Dec. 26, 2014, the contents of all of which are incorporated herein by reference in their entireties.

BACKGROUND

1. Technical Field

The present disclosure relates to a method for producing an electrolytic capacitor, and, in detail, relates to a method for producing an electrolytic capacitor having a solid electrolyte layer.

2. Description of the Related Art

Along with digitalization of electronic devices, small-sized and large capacitance capacitors, which are used in the electronic devices, having low equivalent series resistance (ESR) in a high frequency range have been demanded.

Conventionally, plastic film capacitors, laminated ceramic capacitors, and the like have been used as capacitors for a high frequency range in many cases, however, these capacitors have relatively small capacitance.

Promising candidates as small-sized, large capacitance, and low ESR capacitors are electrolytic capacitors including as a cathode material a conductive polymer such as polypyrrole, polythiophene, polyfuran, or polyaniline. For example, a capacitor element that includes a dielectric layer-formed anode foil, and a solid electrolyte layer including a conductive polymer as a cathode material, which is provided on the anode foil, is proposed.

However, there is a problem that the conductive polymer reacts with moisture to decrease electric conductivity, causing, for example, a decrease in electrostatic capacity and an increase in ESR. In order to solve the problem, it is reported that the solid electrolyte layer is formed with use of a conductive polymer solution containing, together with the conductive polymer, a water-soluble polyhydric alcohol and an oxoacid such as boric acid (see WO 2012/137969 A).

In addition, with regard to the capacitor provided with the solid electrolyte layer, an electrolyte solution containing a polyhydric alcohol, boric acid, and the like has been conventionally used to enhance self-restoration performance and thus improve a withstand voltage (see Unexamined Japanese Patent Publication No. H11-283874).

SUMMARY

A method for producing an electrolytic capacitor according to a first aspect of the present disclosure includes forming a solid electrolyte layer including a conductive polymer and a polyhydric alcohol on an anode body on which a dielectric layer is formed, and impregnating the anode body on which the solid electrolyte layer is formed, with a first treatment liquid that contains an oxoacid having two or more hydroxy groups.

A method for producing an electrolytic capacitor according to a second aspect of the present disclosure includes forming a solid electrolyte layer that includes a conductive polymer and an oxoacid having two or more hydroxy groups on an anode body on which a dielectric layer is formed, and impregnating the anode body on which the solid electrolyte layer is formed, with a third treatment liquid containing a polyhydric alcohol.

According to the present disclosure, there can be provided an electrolytic capacitor whose ESR is reduced and electrostatic capacity is improved.

BRIEF DESCRIPTION OF THE DRAWINGS

FIG. 4 is a flow chart illustrating steps of producing an electrolytic capacitor according to a second exemplary embodiment.

DETAILED DESCRIPTION OF EMBODIMENT

Even when a polyhydric alcohol and a boric acid are, as in a conventional technique, added to a conductive polymer solution for forming a solid electrolyte layer, or an electrolyte solution used in combination with a solid electrolyte layer, reducing ESR and improving electrostatic capacity are insufficient, and further, a withstand voltage sometimes decreases.

<<Electrolytic Capacitor>>

Figure 1:
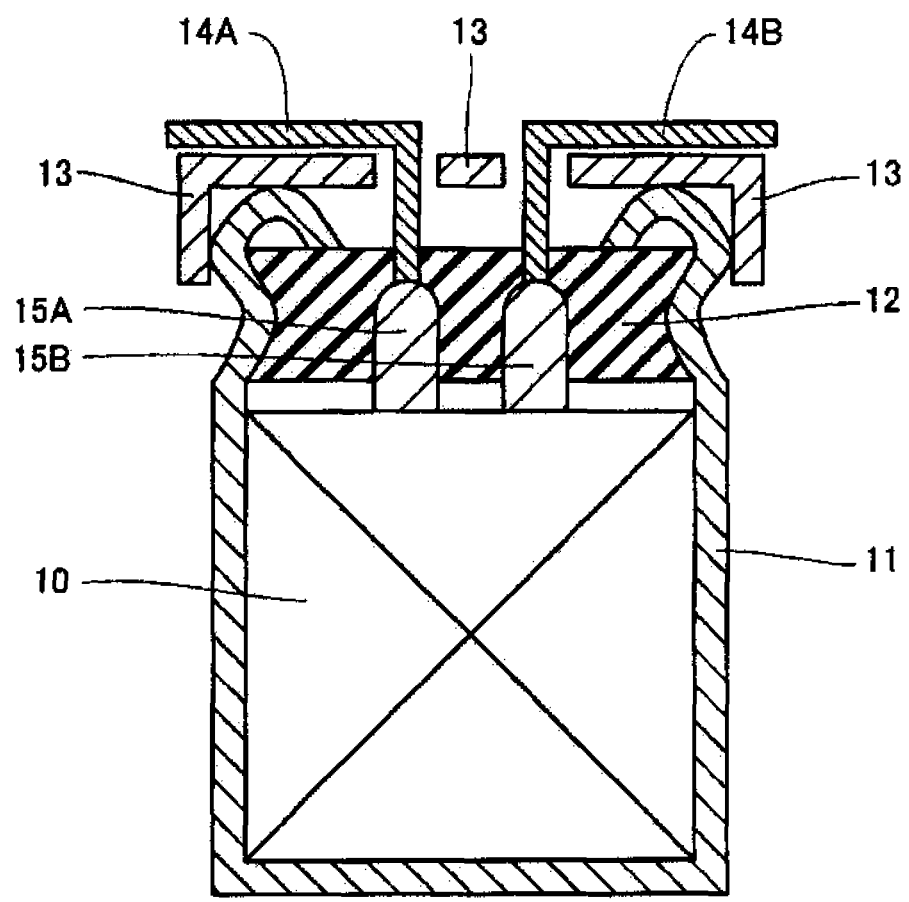
FIG. 1 is a schematic sectional view illustrating an electrolytic capacitor according to an exemplary embodiment of the present disclosure.
Figure 2:
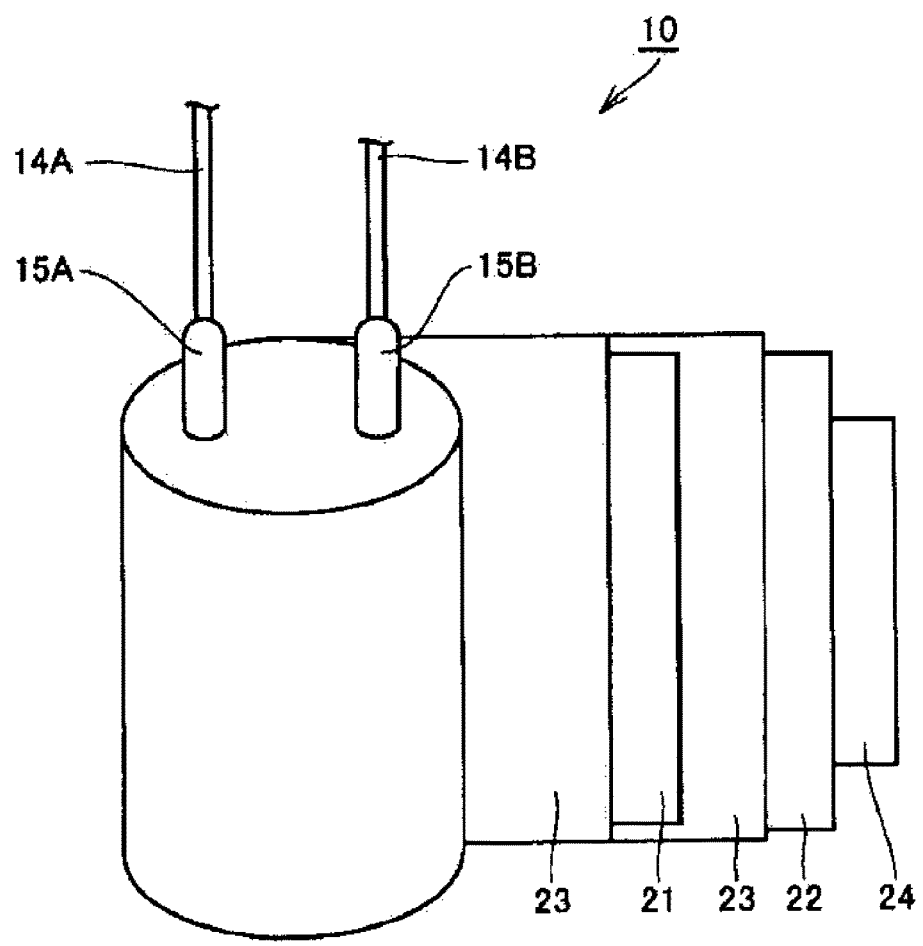
FIG. 2 is a schematic view illustrating a configuration of a capacitor element according to the same exemplary embodiment.

FIG. 1 is a schematic sectional view illustrating an electrolytic capacitor according to a present exemplary embodiment, and FIG. 2 is a schematic view illustrating a partially developed capacitor element included in the same electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolyte solution (not shown). Bottomed case 11 is, at a part near an opening end, processed inward by drawing, and is, at the opening end, curled so as to swage sealing member 12.

Capacitor element 10 includes an anode body having a dielectric layer. For example, capacitor element 10 may include, in addition to anode body 21, lead tab 15A connected to anode body 21, cathode body 22, lead tab 15B connected to cathode body 22, and separator 23 interposed between anode body 21 and cathode body 22, as shown in FIG. 2. In this case, anode body 21 and cathode body 22 is wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to have projections and recesses, and a dielectric layer is formed on the metal foil, which has the projections and recesses. A conductive polymer is attached to at least a part of a surface of the dielectric layer to form a solid electrolyte layer. The solid electrolyte layer may cover at least a part of a surface of cathode body 22 and/or at least a part of a surface of separator 23. Solid electrolyte layer-formed capacitor element 10 may be housed in an outer case together with the electrolyte solution.

<<Method for Manufacturing Electrolytic Capacitor>>

Figure 3:
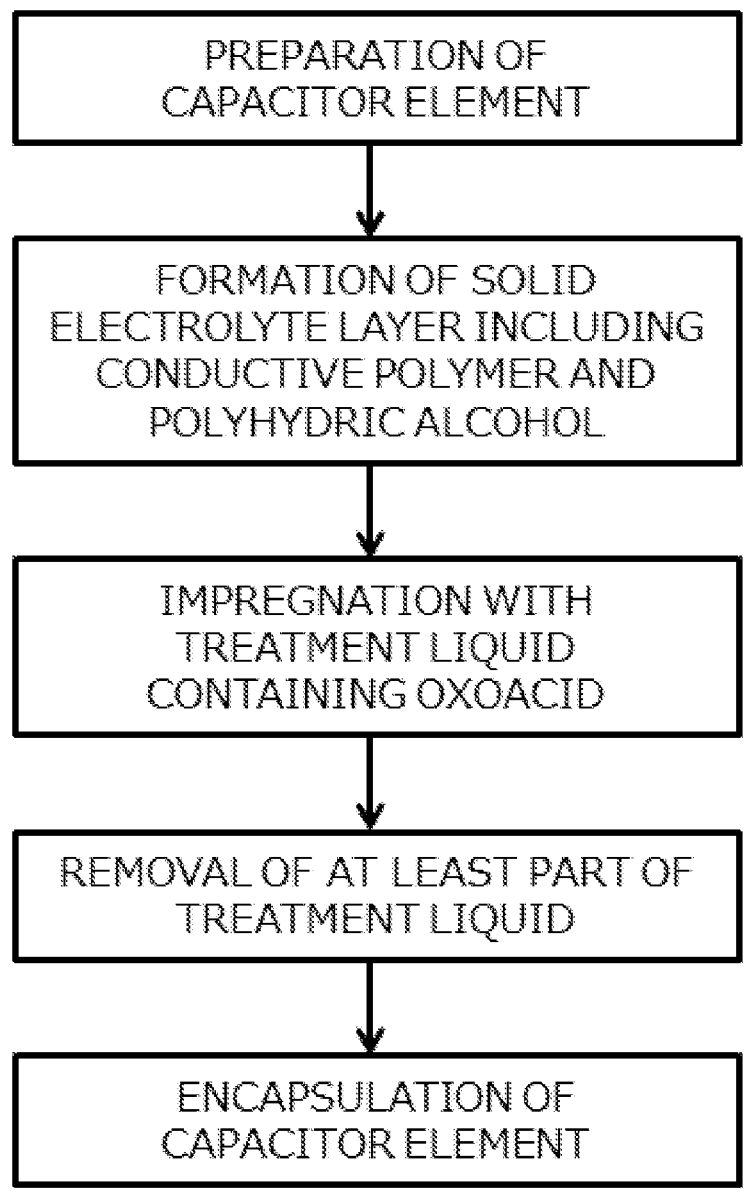
FIG. 3 is a flow chart illustrating steps of producing an electrolytic capacitor according to a first exemplary embodiment.

Hereinafter, an example of the method for producing an electrolytic capacitor according to the present exemplary embodiment is described according to each of steps. FIG. 3 is a flow chart illustrating steps of producing an electrolytic capacitor according to a first exemplary embodiment. FIG. 4 is a flow chart illustrating steps of producing an electrolytic capacitor according to a second exemplary embodiment.

(i) Steps of Preparing Each Material

First, a raw material of anode body 21, i.e. a metal foil is prepared. A type of the metal is not particularly limited, but it is preferable to use a valve metal such as aluminum, tantalum, or niobium, or an alloy including a valve metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment may be performed by, for example, immersing the metal foil in an anodizing solution such as an ammonium adipate solution, followed by application of a voltage.

Normally, a large foil of, for example, a valve metal (metal foil) is subjected to a roughening treatment and an anodizing treatment from the viewpoint of mass productivity. In this case, the treated foil is cut into a desired size to prepare anode body 21.

Further, cathode body 22 is prepared.

A metal foil can also be used for cathode body 22 as with the anode body. A type of the metal is not particularly limited, but it is preferable to use a valve metal such as aluminum, tantalum, or niobium, or an alloy including a valve metal. A surface of cathode body 22 may be roughened as necessary. Further, on the surface of cathode body 22 may be provided an anodizing film, a film of a metal different from the metal that constitutes the cathode body (different type of metal), or a nonmetal film. Examples of the different type of metal and the nonmetal include metals such as titanium and nonmetals such as carbon, respectively.

Next, anode body 21 and cathode body 22 are wound with separator 23 interposed between the anode body and the cathode body. At this time, the winding can be conducted while lead tabs 15A, 15B connected to the electrodes, respectively, are rolled in the anode body, the cathode body, and the separator, to cause lead tabs 15A, 15B to stand up from capacitor element 10 as shown in FIG. 2.

Separator 23 may include a fiber of, for example, cellulose, polyethylene terephthalate, a vinylon, or a polyamide (e.g., an aliphatic polyamide fiber such as nylon and an aromatic polyamide fiber such as aramid). Thickness of separator 23 preferably ranges from 10 µm to 100 µm, both inclusive. Separator 23 having a thickness in this range increases an effect of suppressing a short circuit of the electrolytic capacitor.

A material for lead tabs 15A, 15B is not particularly limited as long as the material is a conductive material. Surfaces of lead tabs 15A, 15B may be subjected to an anodizing treatment. Further, lead tabs 15A, 15B may be covered with a resin material at a part in contact with sealing member 12 and a part connecting to lead wires 14A, 14B. A material for lead wires 14A, 14B connected to lead tabs 15A, 15B, respectively, is not also particularly limited as long as the material is a conductive material.

Then, fastening tape 24 is disposed on an outer surface of cathode body 22 positioned at an outermost layer of the wound anode body 21, cathode body 22, and separator 23, to fix an end of cathode body 22 with fastening tape 24. When anode body 21 is prepared by cutting a large metal foil, capacitor element 10 may further be subjected to an anodizing treatment in order to provide a dielectric layer on a cutting surface of anode body 21.

Next, a solid electrolyte layer is formed on a surface of the dielectric layer of capacitor element 10.

The solid electrolyte layer immediately after formed includes a conductive polymer, and a polyhydric alcohol or an oxoacid having two or more hydroxy groups (hereinafter, sometimes simply referred to as an oxoacid).

Here, a state that the solid electrolyte layer has been formed is defined as follows. The conductive polymer is attached to at least a surface of the dielectric layer, and the conductive polymer attached to the surface of the dielectric layer is not peeled from the dielectric layer even when the capacitor element is impregnated with, for example, a solvent in a following step. Specifically, the solid electrolyte layer is formed, for example, by impregnating the anode body with the conductive polymer as well as a solvent described below and then removing 80% by mass or more of the solvent.

Even when the solid electrolyte layer is formed with use of a dispersion liquid or a solution that contains the conductive polymer, the polyhydric alcohol, and the oxoacid, reducing ESR and improving electrostatic capacity cannot be sufficiently obtained only with such a dispersion liquid or a solution as in WO 2012/137969 A. According to WO 2012/137969 A, a cross-linked structure (complex) is formed in the solid electrolyte layer by a reaction between the polyhydric alcohol and the oxoacid to improve adhesion between the solid electrolyte layer and the dielectric layer. That is, in WO 2012/137969 A, a dispersion liquid or a solution that contains the conductive polymer as well as the polyhydric alcohol and the oxoacid is used for the purpose of improving water resistance and the adhesion between the solid electrolyte layer and the dielectric layer.

However, mixing the polyhydric alcohol and the oxoacid in the dispersion liquid containing the conductive polymer brings a decrease in electrostatic capacity and an increase in ESR. It is becoming clear that mixing the polyhydric alcohol and the oxoacid causes aggregation of the conductive polymer in the dispersion liquid for some unknown reasons. As described above, it is assumed that the aggregation of the conductive polymer in the dispersion liquid, which makes it difficult to form a uniform solid electrolyte layer, is a reason for insufficient reduction in the ESR and insufficient increase in the electrostatic capacity. In addition, since the solid electrolyte layer is ununiform, it is difficult to improve the adhesion between the solid electrolyte layer and the dielectric layer even when the complex is formed in the solid electrolyte layer.

The polyhydric alcohol is considered to have an action of swelling the conductive polymer. Swelling the conductive polymer causes to decrease volume resistivity of the solid electrolyte layer, so that the ESR is reduced. However, when the polyhydric alcohol and the oxoacid are mixed in the dispersion liquid, a complex of the polyhydric alcohol and the oxoacid is formed so that a swelling action of the conductive polymer, which is brought by the polyhydric alcohol, is declined. This is also considered to be a reason for insufficient reduction in the ESR.

On the other hand, as disclosed in Unexamined Japanese Patent Publication No. H11-283874, when the solid electrolyte layer formed in a capacitor element is impregnated with the polyhydric alcohol and the oxoacid, the aggregation of the conductive polymer is less likely to occur. However, the swelling action of the conductive polymer brought by the polyhydric alcohol becomes small, so that the effect of reducing the ESR is less likely to be exhibited. In addition, since the conductive polymer is not swollen, it is difficult for the complex formed by the polyhydric alcohol and the oxoacid to enter into the solid electrolyte layer. Therefore, the complex stays between the solid electrolyte layer and the cathode body, so that an effect of improving the adhesion between the solid electrolyte layer and the dielectric layer brought by the complex is less likely to be exhibited.

In contrast, when one of the polyhydric alcohol and the oxoacid is used together with the conductive polymer to form the solid electrolyte layer, and then the solid electrolyte layer is impregnated with the other, the effects brought by the polyhydric alcohol and the oxoacid are exhibited to a maximum extent. By the method described above, the effects of reducing the ESR and increasing the electrostatic capacity can be obtained.

Hereinafter, first and second exemplary embodiments are separately described in order. The first exemplary embodiment includes forming the solid electrolyte layer including the conductive polymer and the polyhydric alcohol and then impregnating the solid electrolyte layer with the oxoacid, and the second exemplary embodiment includes forming the solid electrolyte layer including the conductive polymer and the oxoacid and then impregnating the solid electrolyte layer with the polyhydric alcohol.

First Exemplary Embodiment

In the present exemplary embodiment, a solid electrolyte layer is formed that includes a conductive polymer and a polyhydric alcohol, and then the solid electrolyte layer is impregnated with an oxoacid.

(ii-1) Step of Forming on Anode Body Solid Electrolyte Layer Including Conductive Polymer and Polyhydric Alcohol (First-1 Step).

A solid electrolyte layer can be formed by impregnating capacitor element 10 with a second treatment liquid containing a conductive polymer and a polyhydric alcohol but not containing an oxoacid.

As the second treatment liquid, there may be used a treatment liquid 2A containing the conductive polymer but not containing the oxoacid, and a treatment liquid 2B containing the polyhydric alcohol but not containing the oxoacid. That is, the solid electrolyte layer may be formed by impregnating capacitor element 10 with the treatment liquid 2A and then impregnating capacitor element 10 with the treatment liquid 2B, or the solid electrolyte layer may be formed by impregnating capacitor element 10 with the treatment liquid 2B and then impregnating capacitor element 10 with the treatment liquid 2A.

A method for impregnating capacitor element 10 with the second treatment liquid (or the treatment liquids 2A and 2B) is not particularly limited. For example, there can be used a method for immersing capacitor element 10 in each treatment liquid housed in a container, and there can be used a method for dropping each treatment liquid onto capacitor element 10. An impregnation period depends on a size of capacitor element 10, but ranges, for example, from 1 second to 5 hours, both inclusive, preferably from 1 minute to 30 minutes, both inclusive. Impregnation may be conducted under a reduced pressure in an atmosphere ranging, for example, from 10 kPa to 100 kPa, both inclusive, preferably from 40 kPa to 100 kPa, both inclusive. Ultrasonic vibration may also be applied to capacitor element 10 or each treatment liquid while capacitor element 10 is impregnated with each treatment liquid.

When capacitor element 10 is impregnated with each of the treatment liquid 2A and the treatment liquid 2B as the second treatment liquid, capacitor element 10 may be impregnated with the treatment liquid 2B (or 2A) after impregnated with the treatment liquid 2A (or 2B), by using the above method. Alternatively, the capacitor element is impregnated simultaneously with the treatment liquid 2A and the treatment liquid 2B, or the treatment liquid 2A and the treatment liquid 2B are simultaneously dropped onto the capacitor element.

Next, at least a part of the second treatment liquid is removed from capacitor element 10. Normally, capacitor element 10 is impregnated with the conductive polymer in a state that the conductive polymer is dispersed in a dispersion solvent. Therefore, by removing, for example, 80% by mass or more of the dispersion solvent impregnating into the capacitor element, the conductive polymer is attached to at least a surface of a dielectric layer to form the solid electrolyte layer. A condition for removing at least a part of the second treatment liquid is not particularly limited. For example, a drying treatment such as drying by heating or drying under reduced pressure may be performed on capacitor element 10.

(iii-1) Step of Impregnating Solid Electrolyte Layer with First Treatment Liquid (Second-1 Step)

Subsequently, the solid electrolyte layer formed in capacitor element 10 is impregnated with a first treatment liquid containing the oxoacid.

A method for impregnating the solid electrolyte layer with the first treatment liquid is not particularly limited. Examples of the method include a method for immersing capacitor element 10 in the first treatment liquid, a method for dropping the first treatment liquid onto capacitor element 10, and a method for coating capacitor element 10 with the first treatment liquid.

Since the solid electrolyte layer is formed after mixing the conductive polymer with the polyhydric alcohol, the conductive polymer is swollen by the polyhydric alcohol so that a uniform solid electrolyte layer can be formed. Then, the solid electrolyte layer is impregnated with the oxoacid. At this time, since the solid electrolyte layer includes a swollen conductive polymer, the oxoacid can easily infiltrate into the solid electrolyte layer. Therefore, a complex of the polyhydric alcohol and the oxoacid is easily formed inside the solid electrolyte layer, and further around an interface between the solid electrolyte layer and the dielectric layer, to improve adhesion between the solid electrolyte layer and the dielectric layer. Further, since the conductive polymer is still kept swollen, an effect of reducing ESR is also improved.

In addition, a withstand voltage is also improved. This is considered to be because a complex formed by a reaction between the polyhydric alcohol and the oxoacid adjusts a pH value inside the solid electrolyte layer in an acidic range that is suitable for anodizing the anode body. That is, the anode body improves in self-restoration performance to improve the withstand voltage. Since the inside of the solid electrolyte layer is in an acidic range, an effect of suppressing dedoping is also exhibited when the conductive polymer includes a dopant.

The oxoacid impregnates into the solid electrolyte layer in an amount preferably ranging from 10 parts by mass to 1,000 parts by mass, both inclusive, relative to 100 parts by mass of the conductive polymer impregnating into capacitor element 10 (anode body). An impregnation amount of the oxoacid in this range facilitates to form the complex of the oxoacid with the polyhydric alcohol.

An amount of the polyhydric alcohol impregnating into capacitor element 10 (anode body) is not particularly limited. Especially, the polyhydric alcohol impregnates into capacitor element 10 (anode body) in an amount preferably ranging from 20 parts by mass to 2,000 parts by mass, both inclusive, relative to 100 parts by mass of the oxoacid impregnating into the solid electrolyte layer, from the viewpoint of reactivity of the polyhydric alcohol with the oxoacid.

(iv-1) Step of Removing at Least Part of First Treatment Liquid (Third-1 Step).

After the second step (second-1 step), capacitor element 10 may be subjected to a drying treatment such as drying by heating or drying under reduced pressure to remove at least a part of the first treatment liquid that is being impregnating into the solid electrolyte layer. The drying treatment is to further improve the adhesion between the solid electrolyte layer and the dielectric layer. When the second treatment liquid (treatment liquid(s) 2A and/or 2B) contains water, a large part of the water (for example, 90% by mass or more of the whole water) is preferably removed in this step.

When at least a part of the first treatment liquid is vaporized by heating, a heating temperature is preferably a temperature higher than a boiling point of a solvent contained in the first treatment liquid. The heating temperature ranges preferably from 50° C. to 300° C., both inclusive, more preferably from 100° C. to 200° C., both inclusive, for example.

With setting, as a series of steps, the first-1 step, the second-1 step, and the third-1 step that is conducted as necessary, the series of steps may be repeated two or more times. Conducting this series of steps a plurality of times can increase coverage of particles of the conductive polymer on the dielectric layer. Alternatively, repetition may be conducted for a step. For example, the second-1 step and further the third-1 step may be conducted after the first-1 step is conducted a plurality of times.

When the third-1 is not conducted, or only a part of the first treatment liquid is removed in the third-1 step, the first treatment liquid retained in the solid electrolyte layer can function as an electrolyte solution. The electrolyte solution may contain a supporting electrolyte described below.

(v) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12, which is formed so as to allow lead wires 14A, 14B to penetrate the sealing member, is disposed above the capacitor element to encapsulate the capacitor element in bottomed case 11. Sealing member 12 is sufficient as long as the sealing member is an insulating substance. As the insulating substance, an elastic body is preferable, and for example, high heat resistance silicone rubber, fluororubber, ethylene propylene rubber, Hypalon® rubber, butyl rubber or isoprene rubber is especially preferable.

Next, bottomed case 11 is, at a part near an opening end, processed by transverse drawing, and is, at the opening end, curled so as to swage sealing member 12. Lastly, base plate 13 is disposed on a curled part of the bottomed case to complete encapsulation. Subsequently, an aging treatment may be performed while a rated voltage is applied.

Second Exemplary Embodiment

In the present exemplary embodiment, a solid electrolyte layer is formed that includes a conductive polymer and an oxoacid, and then the solid electrolyte layer is impregnated with a polyhydric alcohol.

(ii-2) Step of Forming on Anode Body Solid Electrolyte Layer Including Conductive Polymer and Oxoacid (First-2 Step).

A solid electrolyte layer can be formed by impregnating capacitor element 10 with a fourth treatment liquid containing a conductive polymer and an oxoacid but not containing a polyhydric alcohol.

As the fourth treatment liquid, there may be used a treatment liquid 4A containing the conductive polymer but not containing the polyhydric alcohol, and a treatment liquid 4B containing the oxoacid but not containing the polyhydric alcohol. That is, the solid electrolyte layer may be formed by impregnating capacitor element 10 with the treatment liquid 4A and then impregnating capacitor element 10 with the treatment liquid 4B, or the solid electrolyte layer may be formed by impregnating capacitor element 10 with the treatment liquid 4B and then impregnating capacitor element 10 with the treatment liquid 4A.

A method for impregnating capacitor element 10 with the fourth treatment liquid (or the treatment liquids 4A and 4B) is not particularly limited, and examples include the same methods as the methods for impregnating the capacitor element with the second treatment liquid.

The oxoacid impregnates into capacitor element 10 (anode body) in an amount preferably ranging from 10 parts by mass to 1,000 parts by mass, both inclusive, relative to 100 parts by mass of the conductive polymer. An impregnation amount of the oxoacid in this range facilitates to form a complex of the oxoacid with the polyhydric alcohol impregnating into the solid electrolyte layer in a following step.

Next, at least a part of the fourth treatment liquid is removed from capacitor element 10 to form the solid electrolyte layer. Examples of a removal condition include the same conditions as exemplified in the second treatment liquid.

(iii-2) Step of Impregnating Solid Electrolyte Layer with Third Treatment Liquid (Second-2 Step)

Subsequently, the solid electrolyte layer formed in capacitor element 10 is impregnated with a third treatment liquid containing the polyhydric alcohol. A method for impregnating the solid electrolyte layer with the third treatment liquid is not particularly limited, and examples include the same methods as the methods for impregnating the solid electrolyte layer with the first treatment liquid.

The fourth treatment liquid that forms the solid electrolyte layer contains the conductive polymer as well as the oxoacid but does not contain the polyhydric alcohol. Therefore, the conductive polymer does not aggregate so that a uniform solid electrolyte layer can be formed. In addition, the polyhydric alcohol impregnating into the solid electrolyte layer in the following step is likely to swell the conductive polymer in the solid electrolyte layer, so that the polyhydric alcohol can smoothly infiltrate into the solid electrolyte layer including the oxoacid. The polyhydric alcohol that has infiltrated into the solid electrolyte layer swells the conductive polymer and reacts with the oxoacid included in the solid electrolyte layer. As a result, a complex is formed inside the solid electrolyte layer and further around an interface between the solid electrolyte layer and the dielectric layer. Therefore, adhesion between the solid electrolyte layer and the dielectric layer is improved, and a withstand voltage is also improved.

An impregnation amount of the polyhydric alcohol into the solid electrolyte layer is not particularly limited. Especially, the polyhydric alcohol impregnates into the solid electrolyte layer in an amount preferably ranging from 20 parts by mass to 2,000 parts by mass, both inclusive, relative to 100 parts by mass of the oxoacid impregnating into capacitor element 10 (anode body), from the viewpoint of reactivity of the polyhydric alcohol with the oxoacid.

(iv-2) Step of Removing at Least Part of Third Treatment Liquid (Third-2 Step).

After the second-2 step, capacitor element 10 may be subjected to a drying treatment such as drying by heating or drying under reduced pressure to remove at least a part of the third treatment liquid that is being impregnating into the capacitor element. The drying treatment is to further improve the adhesion between the solid electrolyte layer and the dielectric layer. When the fourth treatment liquid (treatment liquid 4A or 4B) contains water, a large part of the water (for example, 90% by mass or more of the whole water) is preferably removed. As drying conditions, the same drying conditions as described above are acceptable.

As described above, the first-2 step, the second-2 step, and the third-2 step that is conducted as necessary, in the second exemplary embodiment may be repeated a plurality of times. Following the second-2 step (after the third-2 step when the third-2 step is conducted), a step of encapsulating the capacitor element is conducted in the same manner as described above. Alternatively, the third-2 step need not be conducted, or only a part of the third treatment liquid may be removed in the third-2 step.

Hereinafter, constituents of each treatment liquid are described.

<First Treatment Liquid>

A first treatment liquid contains an oxoacid and is used to impregnate the solid electrolyte layer formed in the first exemplary embodiment with an oxoacid. The oxoacid is dissolved in a solvent (first solvent). As described below, the first treatment liquid may contain a polyhydric alcohol, and the oxoacid may be contained in the first treatment liquid to form a complex with the polyhydric alcohol. Especially, the first treatment liquid preferably contains at least an ionized oxoacid in terms of an effect of reducing ESR.

In the present exemplary embodiments, the oxoacid is a compound in which an oxo group and two or more hydroxy groups are bonded to an atom other than a carbon atom, and the hydroxy groups give acidic protons. The oxoacid preferably has three or more hydroxy groups.

Examples of such an oxoacid include boric acid, phosphoric acid, phosphonic acid, polyphosphoric acid, sulfurous acid, thiosulfuric acid, and derivatives of these acids. A single one or two or more in combination of these oxoacids can be used. Examples of the derivatives include a metallic salt, ester, and a complex. That is, the oxoacid may be contained in the first treatment liquid, as a reacted product obtained by reacting the oxoacid with a component contained in the first solvent. As described above, the first treatment liquid preferably contains at least an ionized oxoacid from the viewpoint of the effect of reducing the ESR.

Concentration of the oxoacid in the first treatment liquid is not particularly limited, and may be appropriately set so that an amount of the oxoacid impregnating into the solid electrolyte layer falls within the range described above. The concentration of the oxoacid in the first treatment liquid is, for example, 0.1% by mass or more, preferably 0.3% by mass or more. In addition, the concentration of the oxoacid in the first treatment liquid is 15% by mass or less, preferably 10% by mass or less.

The first solvent is not particularly limited, and may be water, a nonaqueous solvent, or a mixture of water and a nonaqueous solvent. The nonaqueous solvent is a collective term for liquids except water, and includes an organic solvent and an ionic liquid. Especially, the first solvent is preferably a nonaqueous solvent. Among nonaqueous solvents, the first solvent is preferably a polar solvent (a protic solvent and/or an aprotic solvent).

The first solvent can contain a polyhydric alcohol. From the viewpoint of the effect of reducing the ESR, the first solvent is preferably such a solvent that allows presence of at least an ionized oxoacid. For example, the first solvent may contain the polyhydric alcohol. The polyhydric alcohol, however, is preferably contained in such a ratio that allows the oxoacid to not only form a complex with the polyhydric alcohol but also be present in an ionized state.

Examples of the protic solvent include: monohydric alcohols such as methanol, ethanol, 1-propanol, butanol, and diethylene glycol monobutyl ether; polyhydric alcohols such as ethylene glycol (EG), propylene glycol, polyethylene glycol (PEG), glycerin, and polyglycerin; and formaldehyde.

Examples of the aprotic solvent include: amides such as N-methylacetamide, N,N-dimethylformamide, and N-methyl-2-pyrrolidone; esters such as methyl acetate and γ-butyrolactone (γBL); ketones such as methyl ethyl ketone; ethers such as 1,4-dioxane; sulfur-containing compounds such as dimethylsulfoxide and sulfolane (SL); and carbonate compounds such as propylene carbonate. A single one or two or more in combination of these solvents may be contained.

The first solvent preferably contains a solvent having a boiling point higher than a boiling point of a second solvent described below. Preferable examples of the first solvent include EG, γBL, and SL. The first treatment liquid may also contain a solute. Examples of the solute include acids such as a carboxylic acid, a sulfonic acid, phosphoric acid, and boric acid and salts of these acids.

The first treatment liquid is used to impregnate the solid electrolyte layer with the oxoacid, and may be allowed to have a function as an electrolyte solution. In other words, the oxoacid may be mixed in a nonaqueous solvent that is normally used as an electrolyte solution, and a mixture may be used as the first treatment liquid.

The electrolyte solution can contain the same solvents as exemplified for the first solvent. Especially preferred are EG, γBL, SL, N-methyl-2-pyrrolidone, and dimethylsulfoxide. The electrolyte solution may contain a nonaqueous solvent and a supporting electrolyte dissolved in the nonaqueous solvent. Examples of the supporting electrolyte include an organic salt.

The organic salt is a salt in which at least one of an anion and a cation includes an organic substance. As the organic salt, there may be used, for example, mono(trimethylamine) maleate, mono(triethylamine) borodisalicylate, mono(ethyldimethylamine) phthalate, mono(1,2,3,4-tetramethylimidazolinium) phthalate, mono(1,3-dimethyl-2-ethylimidazolinium) phthalate, and monoammonium adipate.

<Second Treatment Liquid>

A second treatment liquid contains a conductive polymer and a polyhydric alcohol but does not contain an oxoacid. The second treatment liquid is used to form the solid electrolyte layer in the first exemplary embodiment. In the second treatment liquid, the conductive polymer is, in a particulate state, dispersed in a solvent (second solvent) not containing the oxoacid, and the polyhydric alcohol is dissolved or dispersed in the second solvent.

The second treatment liquid can be obtained by, for example, a method for dispersing particles of the conductive polymer in the second solvent containing the polyhydric alcohol, a method for dispersing particles of the conductive polymer in the second solvent and then adding the polyhydric alcohol to the second solvent, or a method for polymerizing a precursor monomer of the conductive polymer in the second solvent to generate particles of the conductive polymer in the second solvent and then adding the polyhydric alcohol to the second solvent.

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000, both inclusive. A conductive polymer including such a polyanion is easily and uniformly dispersed in a dispersion solvent containing the first solvent, facilitating uniform attachment of the conductive polymer to a surface of a dielectric layer.

An average particle diameter of particles of the conductive polymer is not particularly limited, and can be appropriately adjusted by, for example, polymerization conditions and dispersion conditions. For example, the average particle diameter of particles of the conductive polymer may range from 0.01 µm to 0.5 µm, both inclusive. Here, the average particle diameter is a median diameter in a volume particle size distribution obtained by measurement with a particle diameter measuring apparatus according to dynamic light scattering.

Concentration of the conductive polymer (including a dopant or polyanion described above) in the second treatment liquid is not particularly limited. Especially, the concentration preferably ranges from 0.5% by mass to 10% by mass, both inclusive. The treatment liquid having such a concentration is suitable for attachment of an appropriate amount of the conductive polymer to the dielectric layer and easily impregnates into a capacitor element to give advantages for improvement of productivity.

The polyhydric alcohol is not particularly limited as long as the polyhydric alcohol is a dihydric or higher alcohol (including saccharides). The second treatment liquid may contain a plurality of different types of polyhydric alcohols. Especially, the polyhydric alcohol is preferably at least one selected from the group consisting of ethylene glycol, diethylene glycol, glycerin, polyglycerin, a polyalkylene glycol, trimethylolpropane, mannitol, xylitol, erythritol, and pentaerythritol, in terms of reactivity of the polyhydric alcohol with the oxoacid. Examples of the polyalkylene glycol include polyethylene glycol and polypropylene glycol.

Concentration of the polyhydric alcohol in the second treatment liquid is not particularly limited. Especially, the concentration ranges preferably from 0.3% by mass to 50% by mass, both inclusive, more preferably from 0.5% by mass to 20% by mass, both inclusive, particularly preferably from 0.5% by mass to 10% by mass, both inclusive. The concentration of the polyhydric alcohol in these ranges facilitates swelling of the conductive polymer.

From the viewpoint of swelling the conductive polymer, the polyhydric alcohol is preferably contained in the second treatment liquid in a mass of two or more times, preferably four or more times a mass of a solid content of the conductive polymer contained in the second treatment liquid. From the viewpoint of adhesion between the solid electrolyte layer and the dielectric layer, a mass ratio between the polyhydric alcohol contained in the second treatment liquid and the oxoacid contained in the first treatment liquid (polyhydric alcohol:oxoacid) ranges preferably from 1:1 to 5:1, more preferably from 1:1 to 3:1, particularly preferably from 1:1 to 1.5:1.

The second solvent is not particularly limited as long as the second solvent is a solvent that is other than the polyhydric alcohol and does not contain the oxoacid. Especially, the second solvent is preferably a polar solvent (a protic solvent and/or an aprotic solvent) other than the polyhydric alcohol. Examples of the protic solvent include water and the same protic solvents as exemplified for the first solvent (however, except for the polyhydric alcohol). Examples of the aprotic solvent include the same aprotic solvents as exemplified for the first solvent. Especially, the second solvent is preferably a protic solvent. The second solvent may contain a single one or two or more in combination of these solvents.

Particularly, the second solvent preferably contains water from the viewpoint of handleability and dispersibility of particles of the conductive polymer. Water accounts for preferably 50% by mass or more, further preferably 70% by mass or more, particularly preferably 90% by mass or more of the second solvent.

<Treatment Liquid 2A>

In place of the second treatment liquid, the solid electrolyte layer may be formed with use of a treatment liquid 2A containing a conductive polymer but not containing an oxoacid, and a treatment liquid 2B containing a polyhydric alcohol but not containing an oxoacid. The treatment liquid 2A has the same composition as composition of the second treatment liquid except for not containing the polyhydric alcohol. Concentration of the conductive polymer in the treatment liquid 2A may be the same as the concentration of the conductive polymer in the second treatment liquid.

<Treatment Liquid 2B>

A treatment liquid 2B contains a polyhydric alcohol but does not contain an oxoacid. Examples of the polyhydric alcohol include the same polyhydric alcohols as exemplified in the second treatment liquid.

The treatment liquid 2B may contain a solvent (water and/or a nonaqueous solvent) other than the polyhydric alcohol. In this case, the polyhydric alcohol is dissolved or dispersed in the solvent other than the polyhydric alcohol. Examples of the solvent other than the polyhydric alcohol include the same solvents as exemplified for the second solvent. Especially, the treatment liquid 2B preferably contains water, and a content ratio of water may be the same as in the second treatment liquid. Concentration of the polyhydric alcohol may also be the same as the concentration of the polyhydric alcohol in the second treatment liquid.

<Third Treatment Liquid>

A third treatment liquid contains a polyhydric alcohol and impregnates into the solid electrolyte layer formed in the second exemplary embodiment. The third treatment liquid may contain an oxoacid. From the viewpoint of an effect of reducing ESR, it is preferable that the polyhydric alcohol that does not form a complex with at least the oxoacid is contained in the third treatment liquid.

The third treatment liquid may contain a solvent (water and/or a nonaqueous solvent) other than the polyhydric alcohol. In this case, the polyhydric alcohol is dissolved or dispersed in the solvent other than the polyhydric alcohol. Examples of the solvent other than the polyhydric alcohol include the same solvents as exemplified for the first solvent (however, except for the polyhydric alcohol).

In this case, concentration of the polyhydric alcohol in the third treatment liquid is not particularly limited, and may be appropriately set so that an amount of the polyhydric alcohol impregnating into the solid electrolyte layer falls within the range described above. For example, the concentration of the polyhydric alcohol in the third treatment liquid can range from 0.5% by mass to 50% by mass, both inclusive, from 0.5% by mass to 20% by mass, both inclusive, or from 0.5% by mass to 10% by mass, both inclusive. In addition, from the viewpoint of swelling the conductive polymer, the polyhydric alcohol is preferably contained in the third treatment liquid in a mass of two or more times, preferably four or more times a mass of the conductive polymer included in the solid electrolyte layer.

The third treatment liquid may also be functioned as an electrolyte in the same manner as the first treatment liquid. That is, the third treatment liquid may contain the supporting electrolyte described above in the same manner as in the first treatment liquid.

<Fourth Treatment Liquid>

A fourth treatment liquid contains a conductive polymer and an oxoacid but does not contain a polyhydric alcohol. The fourth treatment liquid is used to form the solid electrolyte layer in the second exemplary embodiment. In the fourth treatment liquid, the conductive polymer is, in a particulate state, dispersed in a solvent (fourth solvent), and the oxoacid is dissolved in the fourth solvent.

The fourth treatment liquid can be obtained by, for example, a method for dispersing particles of the conductive polymer in the fourth solvent containing the oxoacid, a method for dispersing particles of the conductive polymer in the fourth solvent and then adding the oxoacid to the fourth solvent, or a method for polymerizing a precursor monomer of the conductive polymer in the fourth solvent to generate particles of the conductive polymer in the fourth solvent and then adding the oxoacid to the fourth solvent. Examples of the conductive polymer include the same polymers as exemplified in the second treatment liquid.

Examples of the fourth solvent include the same solvents as exemplified for the second solvent. Particularly, the fourth solvent preferably contains water from the viewpoint of handleability and dispersibility of particles of the conductive polymer. Water accounts for preferably 50% by mass or more, further preferably 70% by mass or more, particularly preferably 90% by mass or more of the fourth solvent. Examples of the oxoacid include the same compounds as exemplified in the first treatment liquid.

Concentration of the oxoacid in the fourth treatment liquid is not particularly limited, and may be appropriately set so that an amount of the oxoacid impregnated into capacitor element 10 (anode body) falls within the range described above. For example, the concentration of the oxoacid in the fourth treatment liquid is preferably 0.1% by mass or more, more preferably 0.3% by mass or more. In addition, the concentration of the oxoacid in the fourth treatment liquid is preferably 15% by mass or less, more preferably 10% by mass or less.

<Treatment Liquid 4A>

In place of the fourth treatment liquid, the solid electrolyte layer may be formed with use of a treatment liquid 4A containing a conductive polymer but not containing a polyhydric alcohol, and a treatment liquid 4B containing an oxoacid but not containing a polyhydric alcohol. The treatment liquid 4A has the same composition as composition of the fourth treatment liquid except for not containing the oxoacid. Concentration of the conductive polymer (including a dopant or a polyanion) in the treatment liquid 4A may be, for example, the same as in the treatment liquid 2A.

<Treatment Liquid 4B>

A treatment liquid 4B contains an oxoacid but does not contain a polyhydric alcohol. The oxoacid is dissolved in a solvent. Examples of the solvent include the same solvents as exemplified for the second solvent. The treatment liquid 4A preferably contains water, and a content ratio of water may be the same as in the fourth treatment liquid. Concentration of the oxoacid in the treatment liquid 4B may be, for example, the same as the concentration of the oxoacid in the fourth treatment liquid.

In the exemplary embodiments described above, a wound electrolytic capacitor has been described. The application range of the present disclosure, however, is not limited to the wound electrolytic capacitor and can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not limited to the examples.

Example 1

In the present examples, wound electrolytic capacitors (Φ 10 mm×L (length) 10 mm) each having a rated voltage of 25 V and a rated electrostatic capacity of 330 µF were produced. Hereinafter, a specific method for producing the electrolytic capacitor is described.

(Step of Preparing Anode Body)

A 100-µm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution, followed by application of a voltage of 60 V.

(Step of Preparing Cathode Body)

A 50-μm-thick aluminum foil was subjected to etching to roughen a surface of the aluminum foil.

(Preparation Step: Manufacture of Capacitor Element)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the manufactured capacitor element was subjected to an anodizing treatment again to form a dielectric layer at a cutting end of the anode body. Next, an end of an outer surface of the capacitor element was fixed with a fastening tape.

(First Step: Formation of Solid Electrolyte Layer)

A mixed solution was prepared by dissolving 3,4-ethylene dioxythiophene and dopant polystyrenesulfonic acid in ion-exchanged water (first solvent). Ferric sulfate and sodium persulfate dissolved in ion-exchanged water was added to the resultant mixed solution while the mixed solution was stirred, to cause a polymerization reaction. After the reaction, a resultant reaction solution was dialyzed to remove unreacted monomers and an excessive oxidant, so that a dispersion liquid was obtained that contained about 3.0% by mass of polyethylene dioxythiophene doped with polystyrenesulfonic acid. Mannitol was dissolved in the dispersion liquid to give a second treatment liquid. Mannitol had a concentration of 3.0% by mass in the second treatment liquid.

Next, the capacitor element was impregnated with the resultant second treatment liquid for 5 minutes and then was dried at 150° C. for 30 minutes to form a solid electrolyte layer in the capacitor element.

(Second Step: Impregnation with First Treatment Liquid)

A first treatment liquid was prepared that contained boric acid and water as a first solvent. Boric acid had a concentration of 10% by mass in the first treatment liquid. The first treatment liquid impregnated into the solid electrolyte layer-formed capacitor element. At this time, the first treatment liquid impregnated so that boric acid impregnated in an amount of about 245 parts by mass relative to 100 parts by mass of the conductive polymer that had been impregnated into the capacitor element. Mannitol had impregnated in an amount of about 50 parts by mass relative to 100 parts by mass of boric acid impregnating.

(Third Step: Drying Step)

Next, the capacitor element was dried at 150° C. for 30 minutes.

(Step of Encapsulating Capacitor Element)

The dried capacitor element was housed in an outer case as shown in FIG. 1 and encapsulated to manufacture an electrolytic capacitor.

For the resultant electrolytic capacitor, electrostatic capacity, ESR, and leakage current (LC) were measured. Results are shown in Table 1. Each of characteristic values was acquired as an average of 300 samples.

Example 2

An electrolytic capacitor was manufactured in the same manner as in Example 1 except that the first treatment liquid contained boric acid, EG (first solvent), and monoammonium adipate (supporting electrolyte), and the drying step (third step) was not conducted. Boric acid impregnated in an amount of about 93 parts by mass relative to 100 parts by mass of the conductive polymer that had been impregnated into the capacitor element, and mannitol had impregnated in an amount of about 132 parts by mass relative to 100 parts by mass of boric acid impregnating. Evaluation results are shown in Table 1.

Example 3

An electrolytic capacitor was manufactured in the same manner as in Example 2 except that phosphoric acid was used in place of boric acid, and phosphoric acid impregnated in an amount of about 62 parts by mass relative to 100 parts by mass of the conductive polymer that had been impregnated into the capacitor element. Mannitol had impregnated in an amount of about 200 parts by mass relative to 100 parts by mass of phosphoric acid impregnating. Evaluation results are shown in Table 1.

Example 4

An electrolytic capacitor was manufactured in the same manner as in Example 2 except that glycerin was used in place of mannitol. Evaluation results are shown in Table 1.

Comparative Example 1

An electrolytic capacitor was manufactured in the same manner as in Example 1 except that mannitol was not added to the second treatment liquid, and the first treatment liquid was not used. Evaluation results are shown in Table 1.

Comparative Example 2

An electrolytic capacitor was manufactured in the same manner as in Example 2 except that mannitol as well as boric acid was added to the second treatment liquid, and the first treatment liquid was not used. Evaluation results are shown in Table 1.

Comparative Example 3

An electrolytic capacitor was manufactured in the same manner as in Example 2 except that mannitol was not added to the second treatment liquid, and boric acid as well as mannitol was added to the first treatment liquid. Evaluation results are shown in Table 1.

TABLE 1

| | Second treatment liquid | First treatment liquid | Third step | Electrostatic capacity/ μF | ESR/ mΩ | leakage current/ uA |
|---|---|---|---|---|---|---|
| Example 1 | PEDOT/PSS Mannitol | Boric acid | Conducted | 328 | 11.4 | 2.35 |
| Example 2 | PEDOT/PSS Mannitol | Boric acid | Not conducted | 329 | 11.9 | 2.56 |
| Example 3 | PEDOT/PSS Mannitol | Phosphoric acid | Not conducted | 319 | 11.2 | 2.68 |
| Example 4 | PEDOT/PSS Glycerin | Boric acid | Not conducted | 323 | 11.6 | 2.29 |
| Comparative Example 1 | PEDOT/PSS | — | — | 268 | 15.6 | 2.69 |
| Comparative Example 2 | PEDOT/PSS Boric acid Mannitol | — | — | 288 | 14.5 | 2.77 |
| Comparative Example 3 | PEDOT/PSS | Boric acid Mannitol | Not conducted | 290 | 14.2 | 2.46 |

In Examples 1 to 4 where the solid electrolyte layer was formed that included the polyhydric alcohol and the conductive polymer, and then the formed solid electrolyte layer was impregnated with the oxoacid, results of a large electrostatic capacity and a low ESR were given. The results are considered to be because a uniform solid electrolyte layer was formed and the conductive polymer was swollen. Further, in Examples 1 to 4, leakage current was suppressed to a low level, and therefore adhesion between the solid electrolyte layer and the dielectric layer can be assumed to have been enhanced.

In the examples, the polyhydric alcohol had been added to the solid electrolyte layer in advance, however, also when the oxoacid is added to the solid electrolyte layer in advance, the same effects as in the examples can be obtained.

The present disclosure can be used for electrolytic capacitors including a solid electrolyte layer as a cathode material.

What is claimed is:

1. A method for producing an electrolytic capacitor comprising:
    forming a solid electrolyte layer including a conductive polymer and a polyhydric alcohol on an anode body on which a dielectric layer is formed; and
    impregnating the anode body on which the solid electrolyte layer is formed, with a first treatment liquid that contains an oxoacid having two or more hydroxy groups, wherein:
    before forming the solid electrolyte layer, a second treatment liquid containing the conductive polymer and the polyhydric alcohol but not containing the oxoacid is prepared, and
    the solid electrolyte layer is formed by impregnating the anode body with the second treatment liquid.

2. A method for producing an electrolytic capacitor comprising:
    forming a solid electrolyte layer that includes a conductive polymer and an oxoacid having two or more hydroxy groups on an anode body on which a dielectric layer is formed; and
    impregnating the anode body on which the solid electrolyte layer is formed, with a third treatment liquid containing a polyhydric alcohol, wherein:
    before forming the solid electrolyte layer, a fourth treatment liquid containing the conductive polymer and the oxoacid but not containing the polyhydric alcohol is prepared, and
    the solid electrolyte layer is formed by impregnating the anode body with the fourth treatment liquid.

3. The method for producing an electrolytic capacitor according to claim 1, wherein the first treatment liquid is an electrolyte solution containing a supporting electrolyte.

4. The method for producing an electrolytic capacitor according to claim 2, wherein the third treatment liquid is an electrolyte solution containing a supporting electrolyte.

5. The method for producing an electrolytic capacitor according to claim 1, the method further comprising removing at least a part of the first treatment liquid after impregnating with the first treatment liquid.

6. The method for producing an electrolytic capacitor according to claim 2, the method further comprising removing at least a part of the third treatment liquid after impregnating with the third treatment liquid.

7. The method for producing an electrolytic capacitor according to claim 1, wherein the oxoacid is at least one selected from a group consisting of boric acid, phosphoric acid, phosphonic acid, polyphosphoric acid, sulfurous acid, thiosulfuric acid, and derivatives of these acids.

8. The method for producing an electrolytic capacitor according to claim 2, wherein the oxoacid is at least one selected from a group consisting of boric acid, phosphoric acid, phosphonic acid, polyphosphoric acid, sulfurous acid, thiosulfuric acid, and derivatives of these acids.

9. The method for producing an electrolytic capacitor according to claim 1, wherein the polyhydric alcohol is at least one selected from a group consisting of ethylene glycol, diethylene glycol, glycerin, polyglycerin, polyethylene glycol, polypropylene glycol, trimethylolpropane, mannitol, xylitol, erythritol, and pentaerythritol.

10. The method for producing an electrolytic capacitor according to claim 2, wherein the polyhydric alcohol is at least one selected from a group consisting of ethylene glycol, diethylene glycol, glycerin, polyglycerin, polyethylene glycol, polypropylene glycol, trimethylolpropane, mannitol, xylitol, erythritol, and pentaerythritol.

11. The method for producing an electrolytic capacitor according to claim 1, wherein the oxoacid impregnates into the anode body in an amount ranging from 10 parts by mass to 1,000 parts by mass, both inclusive, relative to 100 parts by mass of the conductive polymer.

12. The method for producing an electrolytic capacitor according to claim 2, wherein the oxoacid impregnates into the anode body in an amount ranging from 10 parts by mass to 1,000 parts by mass, both inclusive, relative to 100 parts by mass of the conductive polymer.

13. The method for producing an electrolytic capacitor according to claim 1, wherein the polyhydric alcohol impregnates into the anode body in an amount ranging from 20 parts by mass to 2,000 parts by mass, both inclusive, relative to 100 parts by mass of the oxoacid.

14. The method for producing an electrolytic capacitor according to claim 2, wherein the polyhydric alcohol impregnates into the anode body in an amount ranging from 20 parts by mass to 2,000 parts by mass, both inclusive, relative to 100 parts by mass of the oxoacid.

* * * * *